April 17, 1934. O. F. BUSS ET AL 1,954,796
APPARATUS AND PROCESS FOR THE PRODUCTION OF COLLOIDAL MATERIAL
AND TREATMENT OF BOILER FEED WATER AND THE LIKE
Filed June 19, 1930 2 Sheets-Sheet 2

Patented Apr. 17, 1934

1,954,796

UNITED STATES PATENT OFFICE 1,954,796

APPARATUS AND PROCESS FOR THE PRODUCTION OF COLLOIDAL MATERIAL AND TREATMENT OF BOILER FEED WATER AND THE LIKE

Oliver F. Buss, West Allis, Wis., and Joseph L. Singleton, Evanston, Ill., and Lloyd M. Dings, West Allis, and Theodore E. Munz, Milwaukee, Wis., assignors to Allis-Chalmers Manufacturing Company, Milwaukee, Wis., a corporation of Delaware Application June 19, 1930, Serial No. 462,223

26 Claims. (Cl. 204—25)

This invention relates in general to apparatus and a process for production of colloidal material and conditioning of fluid in or for use in receptacles and systems, for the purpose of removing undesirable contents or characteristics of the fluid or products resultant from or incident to the presence of said fluid, and it relates more particularly to apparatus and a process for producing colloidal or like material for use in such treatment or conditioning.

Features of the present invention are of more particularly utility in connection with water and steam heating or conversion systems, particularly such systems as include apparatus for evaporating water to convert the same to steam under pressure, and for converting the latter to mechanical energy.

In systems and plants for the production and utilization of steam, particularly for power purposes, many difficulties are present, arising from the presence of foreign matter, particularly solid and gaseous materials, in the feed water, this foreign matter indicating its presence through the formation of scale of varying characteristics in the boiler principally, and to some extent in other parts of the system, and the corrosion of parts of the boiler and other elements of the system; and the presence of dissolved gases, such as oxygen and carbon dioxide, in the steam, in addition to constituting a source of oxygen to promote or assist in corrosion of the boiler and turbine parts, prevents the attainment of the maximum degree of vacuum otherwise attainable in the condensing apparatus of the system.

The formation of scale in boilers and other parts of steam power or heating systems has long constituted a difficulty which has occasioned unreasonably high costs in operation of the system or plant, not only from the standpoint of labor and equipment expenses incident to the necessary treatment of feed water and periodic removal of scale and other sediment formed in the boiler and other parts of the system, but also from the standpoint of inefficient utilization of the energy of the fuel in evaporating the water, where scale is present to any appreciable extent on the tubes and other surfaces of the boiler. The scale formation which clings tightly to the tubes and sheets of the boiler usually includes as its essential part calcium sulphate, calcium carbonate and calcium chloride, ordinarily in the form of a mixture of several of these salts; and this scale acts as a decided heat insulator and is the occasion of very substantial losses of the otherwise available energy of the fuel.

The present invention is more particularly concerned with the preparation of certain materials in a finely divided condition, of a size approximating the atomic or a colloidal state of subdivision, and the disposition of such material in the circulating medium, or in another vehicle adapted for transport to the circulating medium, of a fluid system, such as a water-steam or like system, for the purpose of accomplishing one or more of the following results; to wit, removal of oxygen-containing gases dissolved or occluded in the feed water, removal of scale therefore formed or built up on and adhering to the surfaces or walls of the boiler or other containers or conduits of the system, and the prevention of appreciable further formation of scale of a character which builds up through a cementing or crystallizing action on the surfaces of the boiler or other container.

Particularly favorable results along this line have been secured in connection with the use of colloidal oxidizable inorganic materials, especially such as contain metals of the nickel group, and particularly those having an atomic weight between 55 and 59, iron and nickel, especially the former, appearing to be well adapted for utilization in practicing the present invention in a commercial manner. A characteristic of the more favorable materials is the ability of colloidal or smaller particles of the material to readily, but not too readily, chemically combine with the oxygen in the water; that is, there should be no appreciable tendency to decomposition of the water by the colloidal particles under normal operating conditions in the system A particular feature of the present invention is concerned with the preparation of a colloidal or like medium as above described, by means of apparatus of improved and extremely simple design utilizing an electric arc formed between electrodes one or both of which contain as an ingredient thereof the material to be produced in colloidal or like state of subdivision, and operative to cause deposition of the colloidal or like material in a liquid to be treated or in another vehicle or carrier which may be deposited in such liquid to be treated It is an object of the present invention to provide a novel apparatus and process for producing material of colloidal, or like state of subdivision, particularly adapted for the treatment of water-steam and the like systems for removing or neutralizing deleterious ingredients or materials in liquid and in receptacles of the system.

It is a further object of the present invention to provide an apparatus of improved and extremely simple design and construction and capable of satisfactory operation with a minimum of attention, and a novel process of utility in producing by means of an electric arc material of a coloidal or like state of subdivison, and more particularly producing such material in a condition of dispersion in a fluid carrier.

It is a further object of the present invention to provide improved apparatus of the character described, embodying an electrical arc-producing device wherein one of the electrodes is movable transversely across the active arcing surface of another electrode.

These and other objects and advantages are attained through the present invention, various novel features of which will be apparent from the accompanying description and drawings, disclosing embodiments of features of the present invention, and will be more particularly pointed out in the claims.

Figure 1:
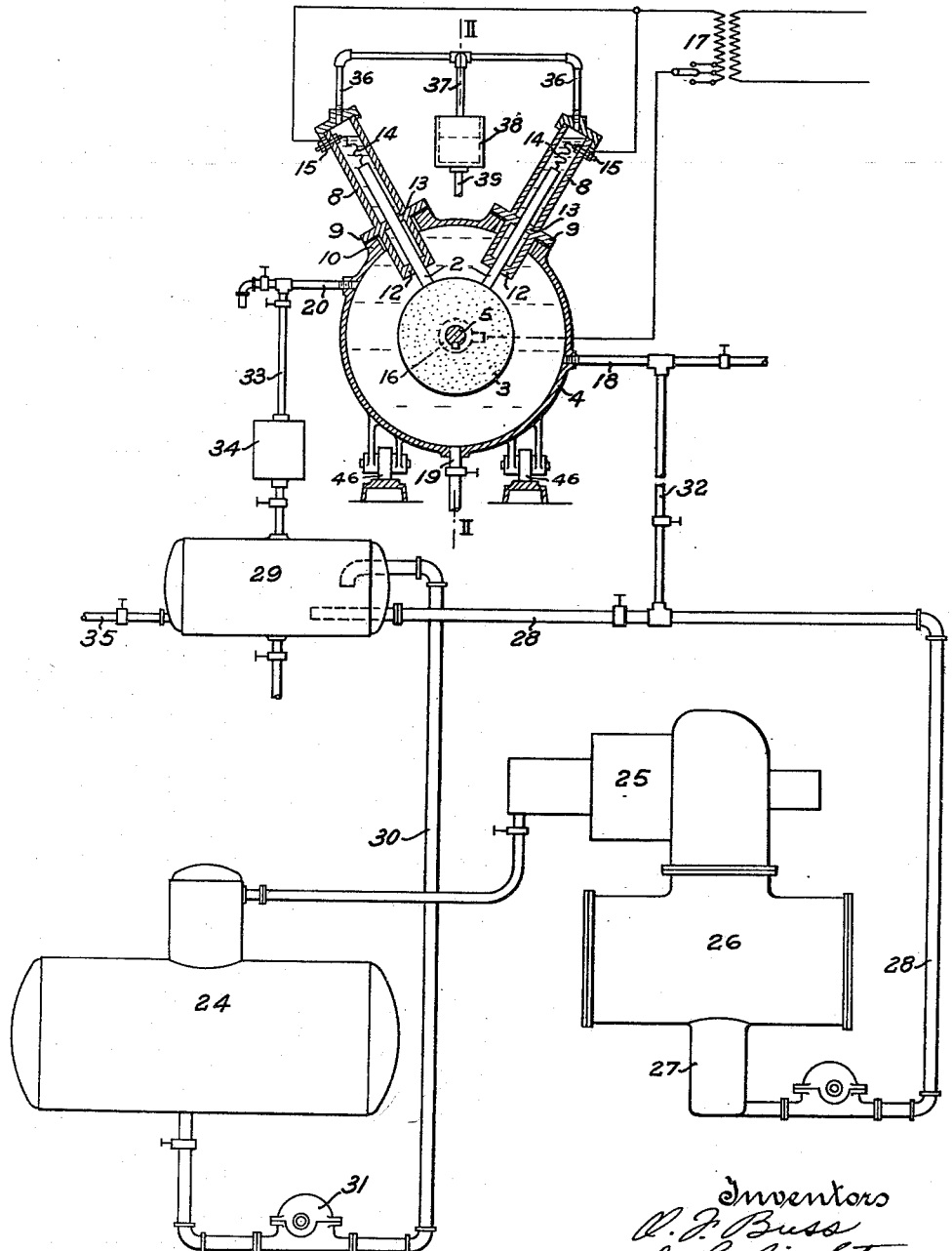
Fig. 1 is a generally diagrammatic showing, with parts in section, of elements of a water-steam system and apparatus for producing colloidal or like material and depositing the same in a liquid carrier and utilizing the colloidal material in the system, generally along the line I—I of Fig. 2.

As indicated in Fig. 1 of the drawings, one or more bar-shaped electrodes 2 of suitable material, preferably cast iron, and an electrode 3 of disk shape and preferably of the same material as the electrodes 2, and mounted for rotation about its axis, are disposed in suitable cooperative position within a tank or receptacle 4, beneath the surface of water or like liquid therein. A satisfactory arrangement is one wherein the rotatable electrode 3 is mounted on a fixed horizontal shaft 5 which projects through a suitably packed stuffing box 6 in an end wall of the receptacle 4, this shaft being suitably driven, as by a motor 7 direct-connected or connected through a reducing gear, as of the multiple V-belt type, to the shaft The electrodes 2, shown as two in number, are angularly spaced, preferably about 60 or 90 degrees apart, with a sufficient vertical component to cause such electrodes to be substantially biased by gravity into engagement with the peripheral face of the disk-shaped electrode 3. Each of the electrodes 2 is preferably mounted in a housing or casing 8 secured in position upon the wall of the receptacle 4, preferably through an external flange 9 on the housing removably secured to a suitable seating portion 10 on the receptacle, preferably through the intermediary of the fluid-tight packing strip of an insulating character. The inner wall of the casing 8 is provided with one or more guides 12 and 13 of sufficient dimensions or sufficiently spaced apart to insure substantially straight line motion of the electrode 2 toward and away from the periphery of the electrode 3. An extensible flexible connector 14 is secured to the outer portion of the electrode 2, the outer end of this connector being secured to a terminal 15 fixed in position on and preferably insulated from the wall of the housing 8.

The electrode 3 is electrically connected, through the shaft 5, to a collector ring 16 carried by the shaft, a brush being disposed in position to suitably bear upon the collector ring. Each terminal 15 and the brush bearing upon the collector ring 16 are connected to a suitable power source 17, such as the secondary of a transformer supplied from a 60 cycle commercial line, and preferably provided with means for varying the voltage thereof. During rotation of the electrode 3 at a reasonably high speed, with current, alternating or direct, supplied to the electrode, an arc or rapidly recurring series of arcs are formed as the active portions of the electrodes separate slightly, and this arc, or series of arcs, thus formed, act to disintegrate the electrodes and, through condensation of vapor formed, produce the desired particles of colloidal or like state of subdivision which become dispersed in the water surrounding the electrodes.

The receptacle 4 may be provided with an inlet or supply conduit 18 and a discharge conduit 19, shown as passing through the bottom of the receptable, and an auxiliary discharge conduit 20, preferably disposed at the upper portion of the receptacle, this latter discharge conduit being of more pronounced utility in connection with the operation of the apparatus as a part of a system for continuously preparing and feeding colloidal material dispersed in water to a water-steam system.

The apparatus disclosed in the drawings for producing colloidal material dispersed in a liquid is illustrated as being adapted for use with a water-steam system, including any number of the usual constituent elements of a modern system for producing steam, utilizing the same in a steam turbine, and condensing the exhaust steam of the turbine for further use in the boilers of the system. The colloid-producing apparatus is shown as being connected in the system in advance of the inlet to the boiler or boilers 24, the latter supplying steam, directly or through a superheater and the like, to a steam turbine 25, from which the steam is exhausted to a condenser 26; and the condensate from the condenser is discharged to a hot-well 27 whence it is pumped or otherwise discharged, through a conduit 28, to a feed water heater 29 from which it is forced, through the conduit 30, by the pump 31 to the inlet to the boiler 24.

A section of the feed line 28 from the hot-well to the boiler may be by-passed by the colloid-producing apparatus, made up of the electrodes 2, 3 and the containing receptacle 4, along with appurtenant parts, the inlet 12 of this receptacle being connected through a conduit section 32 to the conduit section 28, and the discharge 20 of the receptacle 4 being connected to another point of the conduit section 28 nearer the inlet to the boiler 24 or, as indicated, to the feed water heater 29, through an inlet connection 33, preferably provided with a settling chamber 34 which removes heavier particles that do not readily remain dispersed in the water. The condensate fed from the hotwell 27 to the inlet of the boiler may be supplemented to the desired extent by raw or suitably treated water from another source of supply, fed through a pipe line 35 to the boiler inlet or, as indicated, to the feed water heater 29.

As will be apparent, the colloid-producing apparatus, as disclosed in the drawings, may be operated either as a continuously operating apparatus or as a batch apparatus, with shut-off valves in the conduit section 32 and the connection to conduit 33 closed. In case of use as a batch apparatus, the colloidal iron mixture, when produced of the desired concentration is drawn off through the normal discharge 20 or the discharge conduit 19; but where the conduit 19 is used as the discharge, it is particularly desirable that the mixture be passed through a settling chamber, such as the chamber 34, prior to passing it into the boiler feed water, so as to thereby remove the larger particles of metal disintegrated from the electrodes and which are not readily dispersed in the water; and fresh batches of water may be successively supplied to the receptacle 4 through the inlet 18 or otherwise, therein to produce a mixture of water and for treatment in the form of a dispersion therein of the required amount of colloidal metal particles produced by the arc across the electrodes 2, 3.

Figure 2:
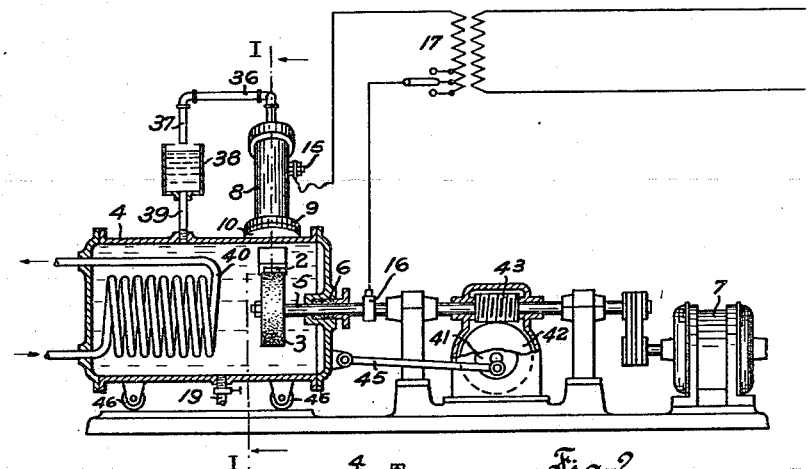
Fig. 2 is a view in broken vertical section of the arc-producing apparatus of Fig. 1, generally in the plane of the line II—II of the latter figure.

With the arrangement of the relatively stationary and rotatable electrodes 2 and 3 described hereinabove, unless the contact faces of the stationary and rotatable electrodes are exactly the same, a groove is apt to be worn through the disintegrating action of the arc, in the face of one electrode of greater width, the other electrode contacting with the first electrode in the groove worn therein. In order to insure uniform wearing away or disintegration of both of the electrodes as the colloidal iron is formed by the arc, it is desirable to move one or both of the electrodes transversely of the other or the general axis of the arc to insure passage of the arc between electrodes across the full face of both electrodes. This transverse relative movement of the electrodes may be effected by providing means for reciprocating one of the electrodes. In the form of reciprocating means disclosed in Figs. 1 and 2, the entire receptacle 4, carrying the stationary electrodes 2, is reciprocated so as to cause the latter electrodes which are held against transverse movement relative to the receptacle, to move transversely across the peripheral face of the rotatable disk electrode 3. As indicated, the casing or receptacle 4 is reciprocated by the shaft 5, acting through an eccentric 41 driven by a gear 42 which meshes with a worm 43 formed on or attached to the shaft 5, a connecting rod 45 serving to transmit the reciprocating motion to the receptacle 4. The casing or receptacle 4 may be provided with slides cooperative with a suitable way or track formed on the base on which the apparatus is mounted, or as indicated in Fig. 2, the receptacle may be provided with rollers 46 for operation on a track formed on the base 1, the idea being to reduce the friction as much as possible.

During operation of the colloid-producing apparatus, there is likely to be decomposition of the water in the receptacle 4, through the action of the electrical arc, for the latter constitutes a considerable source of heat. This dissociation of the oxygen and hydrogen elements of the water is more particularly noticeable at the higher values of current and voltage of the arc circuit, and it occurs much more readily as the temperature of the water approaches the boiling point, and it is quite likely to be present to an undesirable or unduly great degree when the temperature of the body of water in the receptacle is over 60° C. To prevent the accumulation of these dissociated gases under pressure within the receptacle 4 and the possible formation of explosive mixtures in the receptacle or in the immediate vicinity of the apparatus, the main body of the receptacle is suitably vented to provide for the discharge of accumulated gases to a convenient point. For the reason that the electrode housings or casings 8 constitute to some extent natural means for venting the receptacle 4, gases seeking the upper portion of these housings, conduits 36 may be connected to these housings at the upper ends thereof, preferably through attachment to removable cover plates at the upper ends of the housings. These conduits 36 are led individually, or through a common connection 37, to a suitable discharge point, as indicated, the vicinity of an overflow and expansion reservoir 38, connected at its lower end, through a conduit section 39, to the upper portion of the receptacle 4. With the discharge at this point, any steam that may pass over into the conduits 36 and 37 and condense therein can discharge into the expansion chamber 38.

This decomposition of water occurs in the immediate vicinity of the electrical arc, at which point the colloidal particles are produced through condensation of vapors of the material disintegrated from the electrodes; and with this oxygen ingredient of the water immediately available at this point, the colloidal particles of the electrodes are readily oxidized, the result being that, although effort and energy are expended in actually producing the colloidal particles, nevertheless, they do not remain in such condition as to exert their full useful effect later as a deoxidizing agent in the boiler system, in the case of iron electrodes a considerable portion of the originally produced colloidal particles being oxidized, at the temperatures of the liquid bath used as described hereinabove, to a suboxide of iron, more particularly ferrous oxide, the latter remaining dispersed in a colloidal or finer state of sub-division in the water bath.

In order to maintain operation of the apparatus under conditions such as will insure the production of commercially satisfactory amounts of colloidal material formed through disintegration of the electrode and the deposition or dispersion of the same in the water, it is desirable to provide auxiliary cooling means for the liquid in the receptacle 4. This may be done by continually circulating the water or other liquid in the receptacle 4 through an outside cooling vessel or refrigerator and returning the cooled liquid to the receptacle, or by providing within the receptacle 4 a cooling or refrigerating coil 40 through which a sufficiently cool liquid is continuously circulated, this serving to absorb sufficient heat from the liquid in the receptacle 4 to insure maintenance of this liquid at such a suitably low temperature to prevent appreciable decomposition of the water.

As will be apparent from the description hereinabove the apparatus for producing colloidal material includes electrodes one or both of which are biased or yieldingly urged into contact with the other, without the necessity for special feeding apparatus of an elaborate character for maintaining a particular spaced relation between the electrodes, and which might, without skilful attention and care, become inoperative.

The most likely explanation of the action or phenomena occurring during the production of particles of colloidal size through the use of an electrical arc is that, during the passage of the electrical current, either direct or alternating current, between electrodes, such as a pair of iron electrodes, so as to secure a sustained arc or a series of arcs between the electrodes, the heat of the arc vaporizes a small portion of the metal of the electrodes, and this vaporized metal is thereupon chilled by the medium surrounding the arc and condensed in the form of small particles, some atomic, but probably a greater part of a colloidal state of subdivision, and others in the form of larger sized particles, the latter being usually produced by reason of the condensation of several gaseous particles in contact with each other, or sometimes, particularly when the current is high, by the melting or eroding of surface portions of the electrodes in the form of small globules. More ready condensation and facility in the collection of the small particles of iron by the electric arc are attained with the electrodes immersed in water, the latter serving as a ready and convenient vapor-condensing agent and also as a means for collecting and holding in suspension the colloidal particles and maintaining such particles in a medium where they are out of contact with the atmosphere or other substantial source of oxidation.

The yielding pressure with which the relatively stationary electrodes 2 bear on the movable electrode 3, and which may be due to gravity alone or to externally applied yielding pressure, or a combination of both effects, is such as readily permits a series of relatively slight and rapidly recurring separations, with consequent arcing, between these electrodes. The speed of rotation of the disk-shaped electrode 3 and the inertia of the relatively stationary electrodes 2 appear to have considerable effect upon the length of the arc and the rapidity with which the individual arcs follow each other in series. Slight eccentricity of the surface of the rotatable electrode 3, due to inaccuracies of mounting, and probably rough spots left on this surface, originally from imperfect machining and probably later, due to erosion of relatively large particles of the electrode at segregated points by the action of the electric arc, undoubtedly contribute to the ready and rapidly recurring separation of the relatively stationary electrodes from the contact surface of the rotatable electrode. Further, it is possible that the action of the arc itself in suddenly vaporizing, and incident expansion of, globules of water that may be between the electrodes when they are in substantial contact or close to such condition, may assist in causing this separation of the electrodes and consequent arcing.

The ability of the water to retain colloidal iron, in either the original metallic or the modified ferrous oxide form, in suspension may be increased to a considerable extent by the addition to the water of a small amount of peptizing agent, such as silicate of soda, this material itself being of a colloidal character, or other material effective to assist in maintaining the iron in a dispersed state. Those particles of iron of appreciably larger size than correspond to a colloidal state of subdivision, formed by condensation of a number of gaseous particles in contact with each other and being of too great size to remain in suspension, settle to the bottom of the receptacle.

In order to promote a satisfactory condition for a combination of the production of minute iron particles and their collection as a part of the mixture in dispersed condition therein, it is desirable that the voltage and current in the arc circuit be not sufficiently high so that too great a proportion of relatively large globules of the electrodes are melted off, and that the water in the receptacle not be at too high a temperature, which would promote a too rapid rate of decomposition of the water into its component hydrogen and oxygen constituents, and possibly result in the change of a considerable portion of the original metallic colloid to higher oxides of the metal, with consequent loss of the reducing and probably other effects of such originally formed colloidal iron particles in their later use in the boiler system, and undoubtedly resulting in a loss in efficiency of the colloid-producing apparatus itself, that is, insofar as its ultimate use in treating the boiler water and scale deposits therefrom is concerned.

An unusually rough or untrue contact surface on the rotating electrode 3 with which the electrodes 2 engage, and likewise an excessive speed of rotation of the electrode 3, cause violent vibration or oscillation of the electrodes 2, with consequent heavy arcing and increased electrical power consumption and disintegration of particles of the electrode. However, with too heavy or hot an arc, involving increased power consumption, the water in the vicinity of the arc is unduly heated, with consequently unduly increased tendency to decomposition of the water and resulting loss in the maximum desired effects of colloid particles through a too complete oxidation thereof by the dissociated oxygen; further, with too heavy an arc, a greater proportion of relatively large particles are likely to be eroded from the electrodes, and this has the effect of increasing the tendency to excessive vibration or reciprocation of the electrodes 2. We have ascertained that very reasonable economy of operation may be secured, and the contacting surfaces of the electrodes maintained in satisfactorily smooth condition, where the rotating electrode is from five to eight inches in diameter, with the relatively stationary electrodes having a cross-sectional area of approximately two square inches and a length of from seven to twelve inches and biased by gravity alone into contact with the rotating electrode, and the latter rotating at a speed of from 800 R. P. M. to 1100 R. P. M., with an applied voltage of approximately 110 volts (open circuit value) giving an operating current of approximately 150 amperes (closed circuit value through arc).

In order to secure satisfactory results in the preparation of the metal in a colloidal or finer state of subdivision, it is preferable to maintain the current density of the arc at less than fifteen amperes per square centimeter of electrode area and to retain the voltage at as low a value as is consistent with maintaining the arc substantially continuous or in the form of rapidly recurring series of arcs; and it is preferable to maintain the temperature of the water as low as possible, a temperature below 60° C. being preferable.

The operation of forming the colloidal material may proceed to any desired degree of concentration, it not being difficult to readily secure a concentration of 5 to 10 grams or more of colloidal or finer iron dispersed in the water, provided there is no substantial decomposition of the water. The mixture of colloidal iron and water of desired concentration may be dipped out of the electrode receptacle or drawn off through the discharge conduit thereof and stored for desired use in water heating or treating systems.

Where it is desired to transport the mixture of colloidal material dispersed in water in containers, any desired portion of the water may be evaporated from the mixture; and the resultant residue may be used, with desired degree of dilution, prior to being supplied to the feed water or the like.

Figure 3:
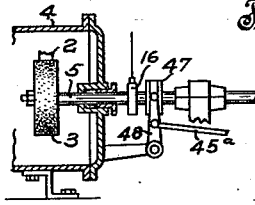
Fig. 3 is a detail view of a modified form of the apparatus shown in Fig. 2.

Instead of the arrangement shown in Fig. 2 for reciprocating one of the electrodes for insuring uniform wear of electrodes, the arrangement of Fig. 3 may be used. As indicated, the receptacle 4 and contacts 2 carried thereby may be secured in position and against movement transversely, the shaft 5 being arranged for reciprocation in any suitable manner, as by providing a grooved collar 47 fixed on the shaft and an actuator 48, of the ordinary clutch-actuator type, with its upper end cooperative with the collar 47 in the usual manner and pivoted at its lower end on a fixed support, and an operating rod 45ª, secured to actuator 48 and actuated by a conventional form of oscillating device, imparts the desired continuous reciprocating movement to the rotating electrode 3 on the shaft 5, thus insuring desired uniform wear or disintegration of the electrodes across the entire active surfaces thereof. The desired reciprocation of electrode 3 may likewise be secured without reciprocating either the shaft 5 or the casing 4, by mounting it on the shaft 5 so as to insure its rotation with but also permit its reciprocation relative to the shaft, a water-proof solenoid or like magnet being disposed in the receptacle 4, with an operating connection from a spring-pressed armature of the magnet to the electrode 3 to reciprocate the latter, and means being provided externally of the casing for intermittently breaking the circuit of the magnet, to secure the desired rate of reciprocation of this electrode.

As indicated in Fig. 2, the pair of electrodes 2 are connected in parallel to one side of the source of electrical energy 17, and hence there are two parallel electrical arc paths through these electrodes to the electrode 3. However, any desired number of similarly arranged parallel arc circuits may be utilized, the electrode 3 acting as one side of the arc circuit; or, where a polyphase electric supply source is utilized, the electrode 3 may act as the neutral of such circuit, each of the electrodes, similar to that designated as 2, or several in parallel, being supplied from the several phase windings of the supply, thus providing a number of electrical arcs corresponding to the number of relatively fixed electrodes, and without the necessity of a connection of the electrode 3 directly to the supply line, as indicated in Figs. 1 and 2.

Figure 4:
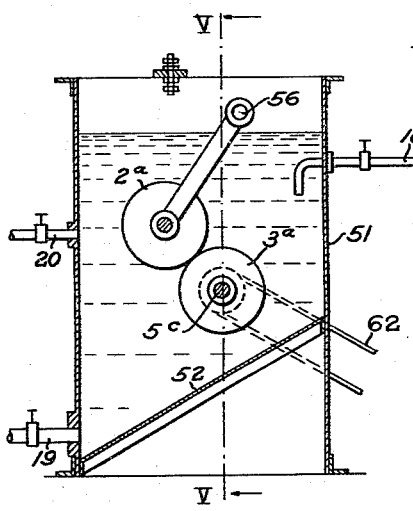
Fig. 4 is a broken vertical sectional view, in the plane of the line IV—IV of Fig. 5, of a modified form of electrical arc-producing apparatus embodying features of the present invention.
Figure 5:
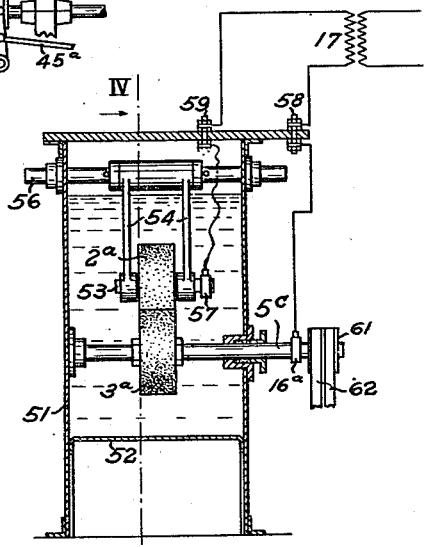
Fig. 5 is a sectional elevation of the apparatus of Fig. 4, in the plane of the line V—V of the latter figure.

Figs. 4 and 5 disclose a modification of the colloid-producing apparatus of Figs. 1 and 2. As indicated a receptacle 51, preferably provided with a bottom 52 of such formation as to provide a settling pocket for the heavier disintegrated particles of the electrodes, is provided with an inlet 18, a discharge 19, and an auxiliary discharge 20 at a higher point.

Of the cooperative electrodes 2ª and 3ª, the electrode 3ª, of disk shape, similar to the electrode 3 of Fig. 1, is mounted upon a rotatable shaft 5ᶜ which has a portion thereof extending, in a suitable fluid-tight manner, to the exterior of the receptacle. The electrode 2ª is of disk shape and may be fixed upon a spindle 53, the latter being rotatably mounted in the end of one or more lever arms 54 having a hub portion pivotally mounted upon a shaft 56 suitably mounted in the upper portion of the walls of the receptacle 51. Current is supplied from a suitable source 17 through terminals 58 and 59 mounted in an insulated manner upon a support carried by receptacle 51, the terminal 58 being connected, through a brush bearing upon a collector 16ª mounted upon the shaft 5ᶜ, to the rotating electrode 3ª; and the terminal 59 is connected, through a brush bearing upon the collector 57 on the spindle 53, to the electrode 2ª. Power may be supplied to the shaft 5ᶜ from any suitable source, as through multiple V-belts 62 driving the sheave 61 on the shaft 5ᶜ.

As indicated, the point of contact of the electrode 2ª with the electrode 3ª is considerably off the vertical plane through the axes of the shaft 5ᶜ and the shaft 56 upon which the lever arm 53, carrying the electrode 2ª, is mounted. Hence, gravity is effective to exert a substantial bias upon the electrode 2ª forcing and maintaining the same in substantial engagement with the electrode 3ª, in spite of appreciable wear of the two electrodes. During operation of the apparatus, the electrode 3ª is in continuous rotation and, as in the case of the relatively stationary electrodes 2 of Fig. 1, the electrode 2ª is caused to momentarily separate, in a rapidly recurring fashion, from the surface of the electrode 3ª, with the consequent production of a rapidly recurring series of short arcs of sufficient intensity to disintegrate the electrodes and cause the production of colloidal particles thereof which are dispersed in the liquid in the receptacle. With the electrode 2ª free to rotate on its axis, this electrode is rotated through frictional engagement by the rotating electrode 3ª, thus continuously presenting new surfaces from which the arc passes to the electrode 3ª and distributing the wear on the electrode 2ª. In order to prevent wearing of a groove in the peripheral surface of one of the electrodes, the electrode 2ª may be caused to oscillate or reciprocate continuously by means of a conventional form of oscillating device acting through an actuator and collar on the shaft 56, in the manner illustrated and described in connection with the apparatus of Fig. 3.

As will be apparent, the receptacle 51 may be provided with any type of cooling means of the general character of that described in connection with the apparatus of Figs. 1 and 2, for the purpose of maintaining the temperature of the liquid adjacent the point where the arc is formed, at a sufficiently low temperature to preclude the formation of an excessive amount of oxygen through decomposition of the water.

Particularly where the colloid-producing apparatus is connected in circuit to continuously or intermittently supply to the boiler or other portion of the system, a mixture of the colloidal material dispersed in water, it is desirable that the amount of the colloidal material fed to the system be such as to take care to the desired extent of the several items or effects of (1) removing adhering scale theretofore formed and present on the walls of the boiler and other parts of the system, (2) conditioning the feed water as to foreign matter therein, particularly solid particles, so as to insure the deposit of such particles, probably carbonates and sulphates principally, in such a manner as does not facilitate or permit the crystalline growth or building up of the heretofore decidedly objectionable combined sulphate and carbonate scale, and (3) reducing the oxygen-containing gases dissolved in the water in the boiler or other parts of the system.

It will be apparent that it is probably desirable to feed a greater amount of colloidal iron to the boilers in the initial stages of the treatment of the system, that is, before removal of, and for the purpose of effecting the removal of, the hard scale theretofore formed and present on the sheets and tubes of the boiler; for a certain portion of the colloidal iron supplied to the boiler appears to be required to effect this scale removal. When this hard scale is substantially removed from the surfaces of the boiler, the amount of colloidal iron may be reduced to some extent, substantial effects of the colloidal material thereafter being the conditioning of the water so as to prevent or substantially hinder further deposition of solids in the water in such form as serves to promote the building up of the hard combined sulphate, which appears to grow in crystalline form, and carbonate scale, and the removal of oxygen-containing gases dissolved in the water.

The amount of iron or like material to be produced and supplied in the treatment of the water of any system would naturally depend upon the original condition of the boilers as to the scale formation therein at the time of beginning of the treatment, and the character of the raw water fed to the boilers, as to dissolved oxygen-containing gases and as to the amount of scale-forming solids in the water.

The action of the colloidal or like particles of iron or the like when introduced into the system in the boilers or at other points, in removing the oxygen of air or other reducible gas is relatively obvious. Because of the minuteness of the oxidizable colloid particles, with their consequently great surface or area available, and their thorough dispersion throughout the liquid particularly in the boiler under working conditions of high temperatures and pressures present therein, the oxidation of the iron is greatly facilitated.

The full details of the action of the iron or like material in a state of subdivision corresponding to at least colloidal condition, dispersed in the water, in removing the scale theretofore formed in the boiler and turbine or other parts of the system, and in substantially preventing or inhibiting the formation of further scale of this character, are not so apparent or readily explainable as to receive unanimous approval at the present time; and it appears advisable to await the acquirement of further knowledge of the chemical and physical actions and effects present before offering a full or complete explanation of these actions and reactions or the theory upon which they depend. However, independently of whether or not it is physical, and possibly dependent upon migration of negatively charged particles or ions of iron or the like, or derivatives thereof, or chemical including oxidation within or behind the scale formation, or a combination of both physical and chemical, the fact remains that the effects exerted in removing the tenacious scale theretofore firmly adhering to the boiler shell and tube walls, particularly the apparently violent tearing or blowing away of large pieces or bodies of this scale from their anchorage on the walls of the boiler parts, are remarkable.

While advantages and characteristics of the present invention have been described more particularly in connection with the utilization of iron in its minute state of subdivision, it will be apparent that other materials are of beneficial application to varying extents for the purpose of effecting one or more of the desirable results described hereinabove; and particularly materials like nickel of an atomic weight very close to that of iron and—apparently oxidizable under more or less generally the same conditions as iron, that is, without effecting an appreciable decomposition of the water under the operating conditions of the water-steam system, have been used with considerable success.

It should be understood that the invention described hereinabove is not limited to the exact details of materials, apparatus, operating effects or other characteristics described hereinabove, for obvious modifications will occur to persons skilled in the art, and it is intended that the invention include all such modifications and applications as are within the scope of the appended claims.

It is claimed and desired to secure by Letters Patent:

1. In an apparatus for producing particles of colloidal or like state of subdivision, the combination of a pair of electrodes, a liquid-containing receptacle in which the active contact portions of said electrodes are immersed, means for supplying electrical energy to said electrodes, one of said electrodes being biased into engagement with the other but free to separate therefrom, and means for causing oscillatory separation of said biased electrode from the other electrode during the passage of electrical current between said electrodes to thereby cause the production of an electrical arc of varying intensity between said electrodes.

2. In an apparatus for producing particles of colloidal or like state of subdivision, the combination of a pair of electrodes one of which contains the material to be produced in colloid or like state, a liquid-containing receptacle in which the active contact portions of said electrodes are immersed, means for supplying electrical energy to said electrodes, one of said electrodes being biased into engagement with the other, and means for causing the active arcing portion of the other electrode to move transversely of the general axis of the current path between said electrodes and to cause oscillatory separation of said electrodes with consequent production of an arc therebetween.

3. In an apparatus for producing particles of colloidal or like state of subdivision, the combination of a pair of electrodes one of which contains the material to be produced in colloid or like state, means for supplying electrical energy to said electrodes, a receptacle adapted to contain liquid in which the active contact portions of said electrodes are immersed, one of said electrodes being biased into engagement with the other, and means for producing rotation of the second of said electrodes about an axis within itself to cause its active arcing portion to move transversely of the axis of the electrical path between said electrodes at a speed sufficient to cause oscillatory separation of said first electrode from said second electrode with consequent production of an electrical arc between said electrodes.

4. In an apparatus for producing particles of colloidal or like state of subdivision, the combination of a pair of electrodes one of which contains the material to be produced in colloid or like state, means for supplying electrical energy to said electrodes, one of said electrodes being biased into engagement with the other, and means for causing the active arcing portion of one of said electrodes to move transversely of the general axis of the current path between said electrodes and to cause oscillatory separation of said electrodes with consequent production of arc therebetween.

5. In apparatus for producing colloidal material for use in the treatment of feed water for boilers or the like, the combination of a receptacle adapted to contain a liquid, a pair of cooperative electrodes mounted in operative position with their active terminal portions engageable by liquid in said receptacle, at least one of said electrodes containing the material to be produced in colloidal form, and a source of electrical energy adapted to supply power to said electrodes to produce an arc between the same on separation thereof, one of said electrodes being rotatable about an axis within itself, the other electrode being biased into engagement with a substantially annular contact portion of said rotatable electrode and adapted to be separated therefrom automatically by said rotatable electrode during rotation of the latter to thereby cause the production of a rapidly recurring series of arcs between said electrodes.

6. In apparatus for producing colloidal material for use in the treatment of feed water for boilers or the like, the combination of a receptacle adapted to contain liquid, a pair of cooperative electrodes mounted in operative position with their active terminal portions engageable by liquid in the receptacle, at least one of said electrodes containing the material to be produced in colloidal form, a source of electrical energy adapted to supply power to said electrodes, one of said electrodes being rotatable about an axis within itself, the other electrode being biased into engagement with a substantially annular contact portion of said rotatable electrode and adapted to be separated therefrom automatically by said rotatable electrode during rotation thereof whereby an arc is drawn between said electrodes, and means for causing movement of the contact portion of one of said electrodes transversely of the direction of travel of the active contact portion of said rotatable electrode during rotation of the latter.

7. In apparatus for producing an oxidizable metal in colloidal form for use in the treatment of feed water for boilers or the like, the combination of a receptacle containing water, a pair of cooperative electrodes mounted in operative position with their active terminal portions beneath the normal level of the liquid in said receptacle, one of said electrodes containing a substantial amount of said oxidizable metal, a source of electrical energy adapted to supply power to said electrodes to thereby produce an arc between the same on separation thereof, one of said electrodes being rotatable about an axis within itself, the other electrode being biased into engagement with a substantially annular contact portion of said rotatable electrode and adapted to be separated therefrom during rotation of said rotatable electrode to thereby cause the production of an arc between said electrodes, and means for causing movement of the contact portion of one of said electrodes transversely of the direction of travel of the active contact portion of said rotatable electrode during rotation of the latter.

8. In apparatus for treating feed water of boilers or the like by depositing therein particles of a colloidal or like state of subdivision, the combination of a receptacle containing a liquid, a pair of electrodes mounted in operative position within said receptacle, one of said electrodes containing material adapted to be rendered in colloidal form through the action of an electrical arc thereon, and means for supplying electrical energy to said electrodes, one of said electrodes being operable to produce movement of the active surface portion thereof transversely of the electrical current path between said electrodes.

9. In apparatus for treating feed water of boilers or the like by depositing therein particles of a colloidal or like state of subdivision, the combination of a receptacle containing a liquid, a pair of electrodes mounted in operative position within said receptacle with their active contact portions beneath the normal level of liquid in said receptacle, one of said electrodes containing an oxidizable metal adapted to be rendered in colloidal form through the action of an electrical arc thereon, means for supplying electrical energy to said electrodes, and means for causing movement of the active surface portion of one of said electrodes transversely of the electrical current path between said electrodes.

10. In apparatus for treating feed water of boilers or the like by depositing therein particles of a colloidal or like state of subdivision, the combination of a receptacle containing a liquid, a pair of electrodes mounted in operative position with their active contact portions immersed in the liquid therein, one of said electrodes being biased into engagement with the other but movable away therefrom, at least one of said electrodes containing an oxidizable material adapted to be rendered in colloidal form through the action of an electrical arc thereon, means for supplying electrical energy to said electrodes, and means for rotating the second of said electrodes about an axis therethrough to thereby cause separation of said electrodes and the consequent production of an arc therebetween.

11. In apparatus for treating feed water of boilers or the like by depositing therein particles of a colloidal or like state of subdivision, the combination of a receptacle containing a liquid, a pair of electrodes mounted in operative position within said receptacle, one of said electrodes containing iron adapted to be rendered in colloidal form through the action of an electrical arc thereon, and one of said electrodes being biased into engagement with the other electrode but movable away therefrom, means for supplying electrical energy to said electrodes, and means for causing movement of the active surface portion of one of said electrodes transversely of the electrical current path between said electrodes.

12. In apparatus for treating feed water of boilers or the like by depositing therein particles of a colloidal or like state of subdivision, the combination of a receptacle containing a liquid, a pair of electrodes containing an oxidizable metal with their active contact portions immersed in the liquid therein, means for supplying electrical energy to said electrodes, one of said electrodes being biased into engagement with a peripheral contact portion of the other but movable away from the latter electrode, and means for rotating said latter electrode to thereby cause separation of said electrodes and the production of an arc between different portions of said rotatable electrode and said first electrode.

13. In combination with a system adapted for conversion of water to steam, apparatus for producing particles of an oxidizable inorganic substance in a state of subdivision corresponding to at least colloidal condition dispersed in a liquid carrier, comprising a pair of electrodes, one of said electrodes containing said inorganic substance, and one of said electrodes being biased into engagement with a second electrode, means for imparting to said latter electrode a rapidly recurring series of movements away from the active surface portion of the other electrode to thereby produce a series of electrical arcs between said electrodes, and means for feeding said liquid with said colloidal material dispersed therein to a water-containing portion of said system.

14. In combination with a system adapted for conversion of water to steam, a liquid-containing receptacle, means for supplying a stream of liquid to said receptacle, means for producing within said receptacle colloidal particles of an oxidizable metal of the character of iron in dispersed phase in the liquid in said receptacle, said means comprising a pair of electrodes one of which contains iron and one of which is biased into engagement with the other electrode, means for moving said latter electrode to cause an active surface portion thereof to move relatively to the active surface portion of the other electrode to thereby cause a rapidly recurring separation of said biased electrode from said other electrode and produce an electrical arc between said electrodes, and means for transporting from said receptacle to a portion of said system said liquid with said colloidal particles dispersed therein.

15. In combination with a system adapted for the conversion of water to steam, a liquid-containing receptacle, means for supplying a stream of liquid to said receptacle, means for producing within said receptacle colloidal particles of an oxidizable metal of the character of iron in dispersed phase in the liquid in said receptacle, said means comprising a pair of electrodes containing iron, one of said electrodes being rotatable upon an axis within itself, the other electrode being biased into engagement with said rotatable electrode, means for moving an elongated active surface portion of said rotatable electrode to cause said active surface portion thereof to move at a speed of at least 200 feet per minute to cause a rapidly recurring series of separations of said biased electrode from said rotatable electrode and the production of a rapidly recurring series of electrical arcs between said electrodes, and means for transporting from said receptacle to a portion of said system said liquid with said colloidal particles dispersed therein.

16. The method of producing a metal in colloidal or like state of subdivision, which comprises passing an electrical arc between electrodes one of which contains said metal to be produced in colloidal or like state during movement of the active surface portion of one of said electrodes relative to the other while immersed in a liquid substantially stable against decomposition under operating conditions which produce desired disintegration to the colloidal state of said metal-containing electrode.

17. The method of producing material in colloidal or like state of subdivision, which comprises passing an electrical current between a rotatable electrode and a second electrode biased into engagement with and free to move rectilinearly with respect to said first electrode while the active portions of said electrodes are immersed in liquid, and rotating said first electrode during the passage of current between said electrodes.

18. The method of producing material in colloidal or like state of subdivision dispersed in a liquid, which comprises passing an electrical current between a rotating electrode having a substantially annular contact surface and a second electrode, one of said electrodes containing said material while the active surface portions of said electrodes are immersed in water, and rotating the active surface portion of said first electrode transversely of the direction of the electrical path between said electrodes at a linear speed of said latter active surface portion of at least 200 feet per minute to thereby produce an electrical arc between the active surface portions of said electrodes.

19. The method of producing material in colloidal or like state of subdivision dispersed in a liquid, which comprises passing an electrical current between a rotatable disk-shaped electrode and a second electrode biased into engagement with but free to move away from a peripheral contact portion of said first electrode, one of said electrodes containing said material, and the active contact portions of said electrodes immersed in the liquid, and rotating said disk-shaped electrode at a sufficiently high speed during the passage of current through said electrodes to cause separation of and the passage of an electric arc between said electrodes.

20. The method of treating feed water of boilers or the like and deposits therefrom, which comprises producing particles of iron in a state of subdivision corresponding to at least colloidal condition by means of the vaporizing effect of an electric arc passing between the active contact portion of an iron-containing electrode and a second electrode biased to engagement with said contact portion of said first electrode but free to move away therefrom, depositing condensation products of said vaporization in dispersed condition in a body of liquid, and passing said liquid with colloidal particles dispersed therein to the boiler or the like.

21. The method of producing a material for treating feed water of boilers and the like and deposits therefrom, which comprises producing particles of a metal of the iron group in a colloidal or like state of subdivision through the disintegrating action upon one of a pair of electrodes of an electrical arc passing between said electrodes during movement of a surface portion of one of said electrodes transversely of the general direction of the electrical path between said electrodes.

22. The method of producing a material for treating feed water of boilers and the like and deposits therefrom, which comprises producing particles of an oxidizable character in a colloidal or like state of subdivision from one of a pair of electrodes through the disintegrating action thereon of an electrical arc passing between said electrodes during relative movement of said electrodes in a direction transverse to the electrical path between said electrodes while the arcing portions of said electrodes are immersed in a liquid which is stable against appreciable decomposition under conditions which permit substantial disintegration of the oxidizable electrode to the colloidal or like state.

23. The method of producing a material for treating feed water of boilers and the like and deposits therefrom, which comprises producing particles of an oxidizable metal of the iron group in colloidal or like state of subdivision dispersed in liquid through the disintegrating action of an electrical arc upon a pair of electrodes containing said metal and the active arcing surface of one of which electrodes moves transversely of the general path of the arc.

24. The method of producing a material for treating feed water of boilers and the like and deposits therefrom, which comprises producing particles of oxidizable metal in a state of subdivision corresponding to at least colloidal condition by means of the vaporizing effect of an electric arc passing between a rotating electrode and a second electrode one of which contains said metal while the arcing portions of said electrodes are immersed in a body of water and the operating conditions are such as do not cause appreciable decomposition of the water, and depositing said particles in the form of condensation products of said vaporization in dispersed condition in said body of water.

25. An apparatus for producing oxidizable particles of colloidal or like state of subdivision, comprising in combination, a pair of electrodes one of which contains material to be produced in colloidal or like state, a receptacle containing a body of liquid in which the active terminal portions of said electrodes are immersed, means for supplying electrical energy to said electrodes, and means for causing relative movement between said electrodes during the passage of electrical current in the form of an arc therebetween, said liquid being stable against appreciable decomposition under conditions wherein said electrode from which colloidal particles are producible is subject to substantial disintegration by the action of said arc.

26. The method of producing metal-containing oxidizable material in colloidal or like state of subdivision, which comprises passing an electrical arc between a pair of electrodes one of which contains said metal, and moving the active terminal portion of one of said electrodes relative to the other while said electrodes are surrounded by a fluid medium capable of inhibiting the oxidation of said material and substantially stable against decomposition by the electrical arc under conditions which insure desired production of colloidal particles.

OLIVER F. BUSS.
JOSEPH L. SINGLETON.
LLOYD M. DINGS.
THEODORE E. MUNZ.